UNITED STATES PATENT OFFICE.

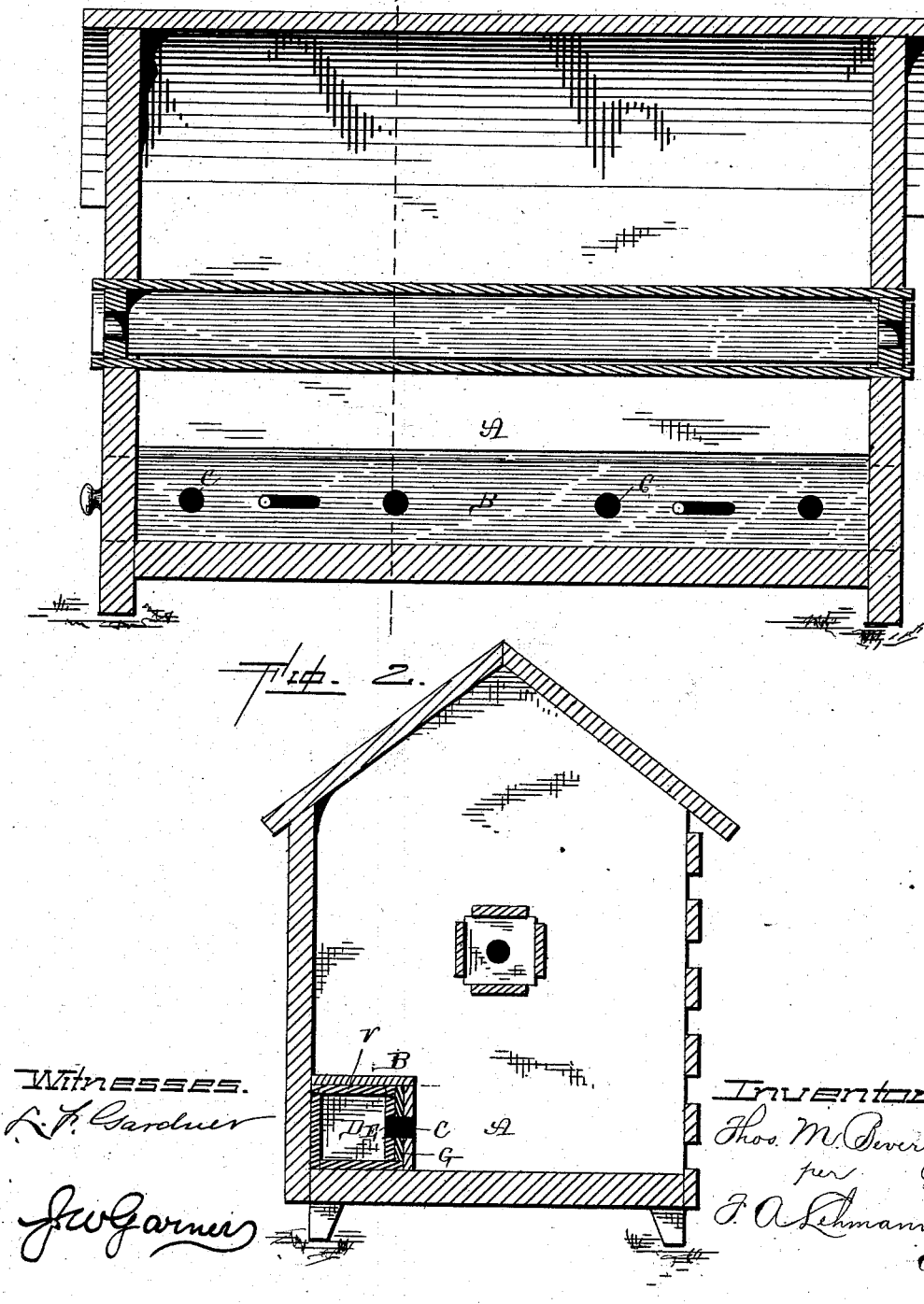

THOMAS M. BEVERAGE, OF MONTEREY, VIRGINIA.

RAT-TRAP FOR BUILDINGS.

SPECIFICATION forming part of Letters Patent No. 295,720, dated March 25, 1884.

Application filed December 14, 1883. (No model.)

*To all whom it may concern:*

Be it known that I, THOMAS M. BEVERAGE, of Monterey, in the county of Highland and State of Virginia, have invented certain new and useful Improvements in Rat-Traps for Buildings; and I do hereby declare the following to be a full, clear, and exact description of the invention, such as will enable others skilled in the art to which it pertains to make and use it, reference being had to the accompanying drawings, which form part of this specification.

My invention relates to an improvement in rat-traps for farm corn-cribs and other buildings; and it consists in the combination of a stationary box, which is built inside of the crib or other building, and having holes through one of its sides, with a sliding removable box, which is placed inside of the stationary box, and which is provided with suitable partitions, a perforated slide, and a removable top, all of which will be more fully described hereinafter.

The object of my invention is to construct a rat-trap which is to be placed inside of the corn-crib or other building, and in which the rats will enter and live until the farmer sees fit to close the slide of the trap, remove the trap, and destroy them.

Figures 1 and 2 are vertical sections of a building to which my trap is applied, taken at right angles to each other.

A represents a corn-crib, smoke-house, or other building, in the lower portion of which is placed the stationary box or frame B, which is open at both of its ends, and which has the openings C through its sides for the rats to pass freely through into the trap. Inside of this stationary perforated box is placed a sliding removable box, D, which has a removable top, V, and a suitable number of perforations, E, through its side, corresponding to the perforations through the stationary box B. This removable box is intended to slide freely back and forth through the stationary box, so that it can be removed at any time when it is desired to kill the rats which have taken shelter in it. In this removable box or trap are a number of partitions, corresponding to the number of openings through the outside of the box, for the purpose of dividing the box into a number of chambers, so as to enable a few of the rats to be gotten out at a time. Applied to the side of this removable box or trap is the slide G, which has a series of holes through it, corresponding to the holes in the stationary box and the trap, and which slide can be moved endwise for the purpose of closing the holes in the trap, and thus prevent the escape of the rats when the trap is being removed from the box. In case the crib or building should be very long, two short boxes or traps can be inserted from opposite ends of the stationary box, and which will then make the traps lighter and more convenient to handle.

When the trap is placed in position, the slide will be moved so as to leave all of the holes in the box and trap open, so as to allow the rats to pass freely in and out of the trap. All of the rats which infest the building will make the trap their home. After a few days, the farmer has but to move the slide endwise, so as to close all the openings in the trap, then withdraw the trap from the box, and by gradually moving the movable cover the trap can be opened, one apartment at a time, and thus destroy the rats contained therein. The trap is then to be returned to position and the rats killed from time to time, as desired. In this manner corn-cribs and outbuildings of all kinds may be readily and quickly cleared of rats and mice, and that with very little trouble.

Having thus described my invention, I claim—

The combination of a suitable stationary box having openings in one of its sides with the removable trap, which is to be placed inside of this stationary box, and which is provided with a removable top and a suitable number of perforations through its side, and the perforated endwise-moving slide, substantially as shown and described.

In testimony whereof I affix my signature in presence of two witnesses.

THOMAS M. BEVERAGE.

Witnesses:
 ANDERSON PUFFENBARGER,
 GEORGE COLAW.